Figure 1:
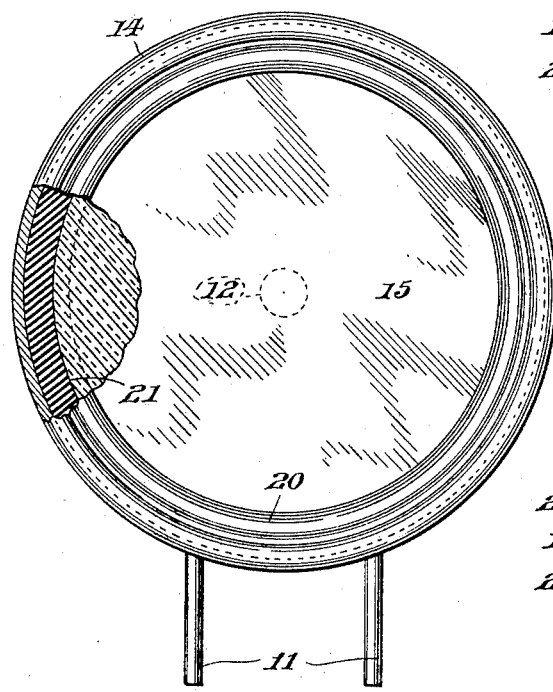

F. W. RENWICK.
LENS HOLDER FOR HEADLIGHTS.
APPLICATION FILED FEB. 12, 1919.

1,334,924.

Patented Mar. 23, 1920.

Inventor
F. W. Renwick
By F. A. Bryant
Attorney

UNITED STATES PATENT OFFICE.

FREDERICK W. RENWICK, OF NORRISTOWN, PENNSYLVANIA.

LENS-HOLDER FOR HEADLIGHTS.

1,334,924.        Specification of Letters Patent.     Patented Mar. 23, 1920.

Application filed February 12, 1919. Serial No. 276,491.

*To all whom it may concern:*

Be it known that I, FREDERICK W. RENWICK, a citizen of the United States of America, residing at Norristown, in the county of Montgomery and State of Pennsylvania, have invented certain new and useful Improvements in Lens-Holders for Headlights, of which the following is a specification.

The primary object of the invention is the provision of a holder for resiliently mounting the glass plate in a headlight or similar device whereby the liability of breaking the said fragile plate by vibration is obviated as well as rendering the positioning of the glass plate in a headlight more easy and safe.

A further object of the invention is to provide a glass plate holder for lamps such as the headlights of vehicles that is easily installed and prevents the glass from coming in contact with any metal parts, the glass being resiliently mounted and all of which prevents any strain upon the glass due to vibrations, shocks and jars while the glass is also prevented from loosening and rattling.

A still further object of the invention is the provision of a glass plate holder for headlights that is easy and inexpensive to manufacture, is readily snapped onto a glass or lens of smaller diameter than that usually required and which renders the operation of positioning the glass plate in the headlight more safe and easy.

With these general objects in view the invention consists in the novel combination and arrangement of parts hereinafter fully described in connection with the accompanying drawing, forming a part of this application and in which like reference characters designate corresponding parts throughout the several views.

Figure 2:
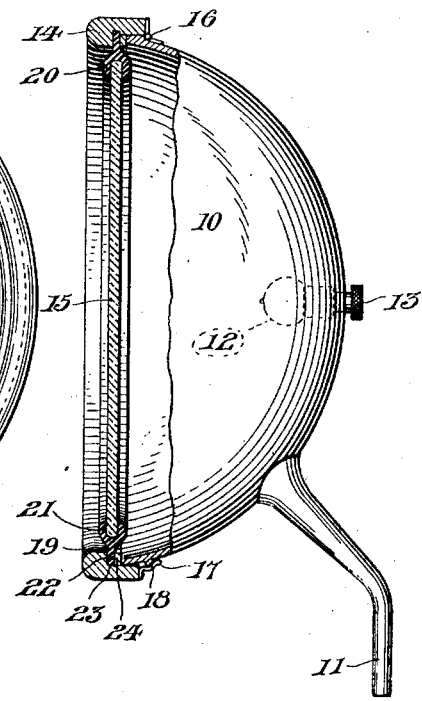
Figure 3:
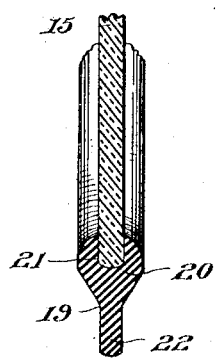
Figure 4:
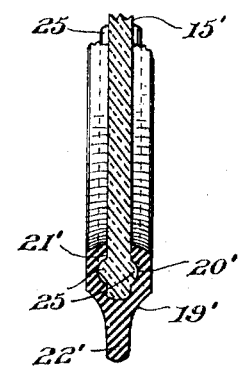

In the drawing:

Figure 1 is a front elevation of a headlight embodying my invention partially broken away, Fig. 2 is a view thereof partly in side elevation and partly in central vertical section, Fig. 3 is an enlarged detail sectional view of a glass plate with my holder mounted thereon and Fig. 4 is a view similar to Fig. 3 of a slightly modified form of the invention.

Referring more in detail to the drawing, my invention is illustrated in connection with a substantially usual form of automobile headlight consisting of a hollow semi-circular lamp body 10 adapted for mounting upon a vehicle by downwardly projecting brackets 11 while an electric lamp 12 is centrally mounted within the body 10 having an electrical connection 13 outwardly thereof.

A ring or bezel is provided for the body 10, adapted for securing a circular glass 15 commonly known as a lens at the forward open side of the body 10. In the form of headlight or lamp herein illustrated, the ring 14 is connected by a hinge 16 at the top thereof to the body 10 while a spring clip 17 at the bottom of the ring 14 engages over a suitable lug 18 upon the bottom of said body for retaining the ring 14 in its closed position.

My invention consists in the provision of a resilient annulus or gasket 19 formed of rubber or similar suitable material and being substantially Y-shaped in cross section. The annulus or gasket 19 consists of a bead 20 having a circular groove or recess 21 formed in its inner periphery to provide a holder and with an annular yielding relatively thin rib or web 22 opposite the groove 21 upon the outer periphery of said holder or bead 20.

The annulus 19 by reason of its resiliency and elasticity is snapped over the periphery of the circular glass 15 with the edge of the latter seated within the annular groove 21 and whereby the annulus 19 is firmly mounted upon the glass plate 15 for the purpose of holding the said glass plate when the annulus 19 is held in any manner desired.

The annulus 19 with its glass plate 15 is then adapted to be positioned within the cutaway portion or ledge 23 of the ring 14, the rib 22 seating within said inner cutaway portion 23 of the ring with the outer or forward face of the rib 22 engaging the ring 14 and with a suitable washer or gasket 24 engaging the rear face of the rib 22 within the cutaway portion 23. With the glass plate 15 and the annulus 19 positioned in this manner, in the ring 14, the ring is closed and the glass plate 15 is resiliently held in its operative position as illustrated in Figs. 1 and 2 of the drawing.

Any shocks or jars exerted upon the body 10 will be absorbed by the rubber annulus 19 and prevent cracking and breaking the glass plate 15. A smaller sized glass plate than that required for filling the ring 14 will be employed when my annulus 19 is in use and the use of such annulus renders the positioning of the glass plate in the headlight an easy matter without the liability of breaking the said glass plate 15.

A modified form of the holder and glass plate is illustrated in Fig. 4 of the drawing and in which annular projections 25 are provided upon the glass plate 15' at the opposite sides of the glass plate and slightly spaced from the outer periphery of the glass plate. An annulus or gasket 19' of substantially the same form as the annulus 19 is provided with a bead portion having a receiving groove 21' for the edge of the glass plate 15' and with sockets 20' at opposite sides within the bead groove 21' adapted for the reception of said projections 25. The annulus 19' is snapped upon the glass plate 15' in the manner heretofore described while the rib 22' of said annulus is mounted in the headlight in a manner heretofore set forth. My holder or annulus is easy and inexpensive to manufacture and is readily mounted upon the front glass of a lamp or headlight so as to be easily and quickly positioned in the usual holding means or ring thereof.

What I claim as new is:—

1. The combination in a light projector, of a casing with a closure comprising a glass plate and a glass plate supporting frame, said frame having a light emitting opening, the glass plate being of lesser diameter than the light emitting opening and spaced from the circumference of said opening, and yielding means between the glass plate and the frame connecting the glass plate circumferentially to said frame, whereby the glass plate is bodily yieldingly supported.

2. In an illuminating device, the combination with a fragile plate, of a gasket surrounding said plate and supporting the same, said gasket comprising a holder embracing the opposite sides of the margin of said fragile plate and having a relatively thin web-like yielding portion integral with said holder and surrounding the same, and plate-supporting means having a light emitting opening of greater dimension than said fragile plate and adapted for clamping the margin of said gasket whereby said fragile plate is yieldingly mounted in the opening of said supporting means.

3. The structure called for by claim 2 characterized in that annular projections are provided on the opopsite sides of the said fragile plate adjacent the edge thereof, the embracing portions of the holder having opposite sockets adapted for the reception of said projections when the device is assembled.

In testimony whereof I affix my signature.

FREDERICK W. RENWICK.